US007299712B2

(12) United States Patent
Wang

(10) Patent No.: US 7,299,712 B2
(45) Date of Patent: Nov. 27, 2007

(54) ENERGY STORAGE DISCONNECTING SWITCH

(76) Inventor: GuangShun Wang, No. 1 WeiXu North Road, AnQui, ShangDong Province (CN) 262100

( * ) Notice: Subject to any disclaimer, the term of this patent is extended or adjusted under 35 U.S.C. 154(b) by 260 days.

(21) Appl. No.: 11/235,500

(22) Filed: Sep. 26, 2005

(65) Prior Publication Data

US 2006/0214754 A1 Sep. 28, 2006

(30) Foreign Application Priority Data

Mar. 23, 2005 (CH) ........................ 2005 1 0056435

(51) Int. Cl.

| | |
|---|---|
| ***F16H 3/08*** | (2006.01) |
| ***F16H 57/00*** | (2006.01) |
| ***F16H 29/20*** | (2006.01) |
| ***F16C 1/10*** | (2006.01) |
| ***B62D 5/04*** | (2006.01) |

(52) U.S. Cl. ......................... 74/329; 74/411; 74/89.14; 74/500; 180/444

(58) Field of Classification Search .................. 74/724, 74/325, 329, 355, 404, 411, 89.14, 492, 496, 74/498, 500; 180/444, 447
See application file for complete search history.

(56) References Cited

U.S. PATENT DOCUMENTS

| | | | | |
|---|---|---|---|---|
| 5,038,633 A * | 8/1991 | Igarashi et al. | ............... | 74/664 |
| 5,042,315 A * | 8/1991 | Fahy et al. | .................... | 74/411 |
| 5,172,884 A * | 12/1992 | Ishiyama | .................... | 248/479 |
| 6,397,691 B1 * | 6/2002 | Greene | ........................ | 74/89.2 |
| 2006/0081080 A1 * | 4/2006 | Ho | .............................. | 74/329 |

FOREIGN PATENT DOCUMENTS

CN 98220417.5 9/1999

* cited by examiner

*Primary Examiner*—Roger Pang
(74) *Attorney, Agent, or Firm*—Hamre, Schumann, Mueller & Larson, P.C.

(57) ABSTRACT

The present invention relates to an energy storage disconnecting switch used in extra-high voltage and ultra-high voltage grid, in particular, relates to a scissor-type disconnecting switch. With the principle of storing energy in spring, the present invention provides an energy storage spring case having energy storage spring therein, to release the spring energy to operate the disconnecting switch by using the stored energy, to satisfy the need for quick action of the electric disconnecting switch.

6 Claims, 5 Drawing Sheets

ENERGY STORAGE DISCONNECTING SWITCH

FIELD OF THE INVENTION

This invention relates to an energy storage disconnecting switch.

BACKGROUND OF THE INVENTION

The existing disconnecting switches use motor-type driving devices to directly drive insulated revolving shaft to operate crank at high-voltage side, so as to perform switch-on/switch-off operations through the crank. For example, 123-550KV scissor-type disconnecting switch manufactured by ALSTOM (China) Investment Co., Ltd. has such structure. Since this type of disconnecting switch uses motor direct drive mode, the speed is relative slow when the motor just starts up, and then the speed gradually increases. However, the switch requires relative high separating speed when performing switch-on/switch-off operations. No matter it is motor direct drive type or other types of mechanical direct drive disconnecting switches, the above deficiencies are inevitable. In addition, the two cranks of the scissor-type disconnecting switch perform relative movement through synchronous opposite rotation of two directly engaged gears. Due to the space between the two gears is too small, the maximum turning angle for the two cranks is 90 degree. When the two cranks clamp the bus, they may tend to open towards sides, and may upwardly impact the bus upon mobile contact on top of the crank touches fixed contact. This will affect the service life and stability of the mechanism.

SUMMARY OF THE INVENTION

The object of the present invention is to provide an energy storage disconnecting switch that has relative high separating speed, is able to manually switch-on and switch-off, and the contacts thereof is unlikely to get loosened after the switch is closed.

To achieve the above objects, the present invention provides the following technical solutions:

An energy storage disconnecting switch of the present invention includes a base, a transmission case and a gear box fixed on top of the base, an insulated support and an insulated revolving shaft connecting the transmission case and the gear box; the gear box includes left gear and right gear, the left gear/right gear respectively connects to a left crank/a right crank; bottom end of the insulated revolving shaft is in transmission connection with a driving device, and top end of the insulated revolving shaft having bevel gear engages with gear in the gear box; characterized in that: the transmission case includes an energy storage spring case and a bistable commutator that are in transmission connection with the driving device; the energy storage spring case has a support, a horizontal shaft installed on the support through a bearing, an energy storage brake disk fixed onto one end of the horizontal shaft, a spring inner support disk fixed onto the other end of the horizontal shaft, a spring outer support disk sleeved onto the support through bearing, a disc spring having one end fixed onto the spring inner support disk and the other end fixed onto the spring outer support disk; the spring outer support disk being in transmission connection with the driving device through an energy storage worm and worm gear; the horizontal shaft connecting to an input shaft of the bistable commutator through a shaft coupler, an output shaft of the bistable commutator connecting to the insulated revolving shaft through a steering worm and worm gear, and a switch-on/switch-off brake disk installed onto the steering worm and worm gear.

A plurality of translating gears are disposed between the left gear and the right gear, and the number of the translating gears is an even number.

The input shaft, the output shaft and a transition shaft are installed in the bistable commutator through bearing, in which a switch-on gear and a constant-mesh gear are fixed onto the input shaft, a double chain gear slideably installed onto the output shaft through a spline mechanism, and a constant-mesh gear and a switch-off gear are fixed onto the transition shaft. The constant-mesh gear of the input shaft is engaged with the constant-mesh gear of the transition shaft, and the double chain gear is slideable on the output shaft to engage with either the switch-on gear of the input shaft or the switch-off gear of the transition shaft. The double chain gear of the output shaft connects to a fork.

The fork connected to the double chain gear is fixed onto a fork rod, and the fork rod is in transmission connection with a bistable permanent magnet mechanism. The bistable magnet mechanism has a casing with an output shaft therein. The output shaft extends from both ends of the casing, in which the front end connects to the fork rod. A core is fixed onto the output shaft, and a permanent magnet is disposed outside the core. The permanent magnet connects to the casing, and a set of impulse coil is disposed on each end of the permanent magnet respectively. An anti-magnetic sleeve is placed at contact part between the output shaft and the casing. The casing around the anti-magnetic sleeve has inwardly raised end-cap magnetic shoes, and the casing between the two impulse coils has inwardly raised casing magnetic shoes.

With the above technical solutions, the present invention has the following advantages:

1. The direct power to drive the cranks comes from the energy stored in the spring. Because the spring has the characteristics that it has the most energy when just being released, the disconnecting switch of the present invention has high separating speed. This overcomes the deficiencies of the disconnecting switch using motor direct drive, which has relative slow separating speed.
2. Due to the remaining spring force always acts on the insulated revolving shaft after the energy storage spring being released, the contacts can maintain enough pressure after switching on, to ensure good contact.
3. Due to translating gears being added in the gear box, which enlarge the distance between the left gear and the right gear, the two cranks can turn to an angle of 120 degrees. Upon the crank passes the vertical point, the upper pivot starts to descend, which basically offsets the rising effect caused by decreasing angle of the two cranks. Thus, when mobile contact approaches fixed contact, the mobile contact turns into transverse movement from up-and-down motion, so as to avoid upwardly impacting the bus when the two contacts touch each other, and to improve the mechanical stability of the disconnecting switch.
4. Upon switching on, with the effect of gravity, the two cranks may tend to clamp more tightly, and thus to overcome the deficiency of contacts being easily loosened after the switch is closed.
5. With spring storing energy, a manual energy storage handle can be installed onto the driving device. When the motor experiences malfunction and cannot store energy, it is possible to store energy manually, and switch-on/switch-off speed will not be affected.

6. When ice covers the disconnecting switch on the surface, due to the spring mechanism has high initial energy, by repeatedly operating the switch to break the ice, switch-on/switch-off operation can be effectively carried out. Thus, the disconnecting switch adapts to use in more extended environments, where the motor direct-drive switches are unable to use.

DETAILED DESCRIPTION OF THE PREFERRED EMBODIMENT

Figure 1:
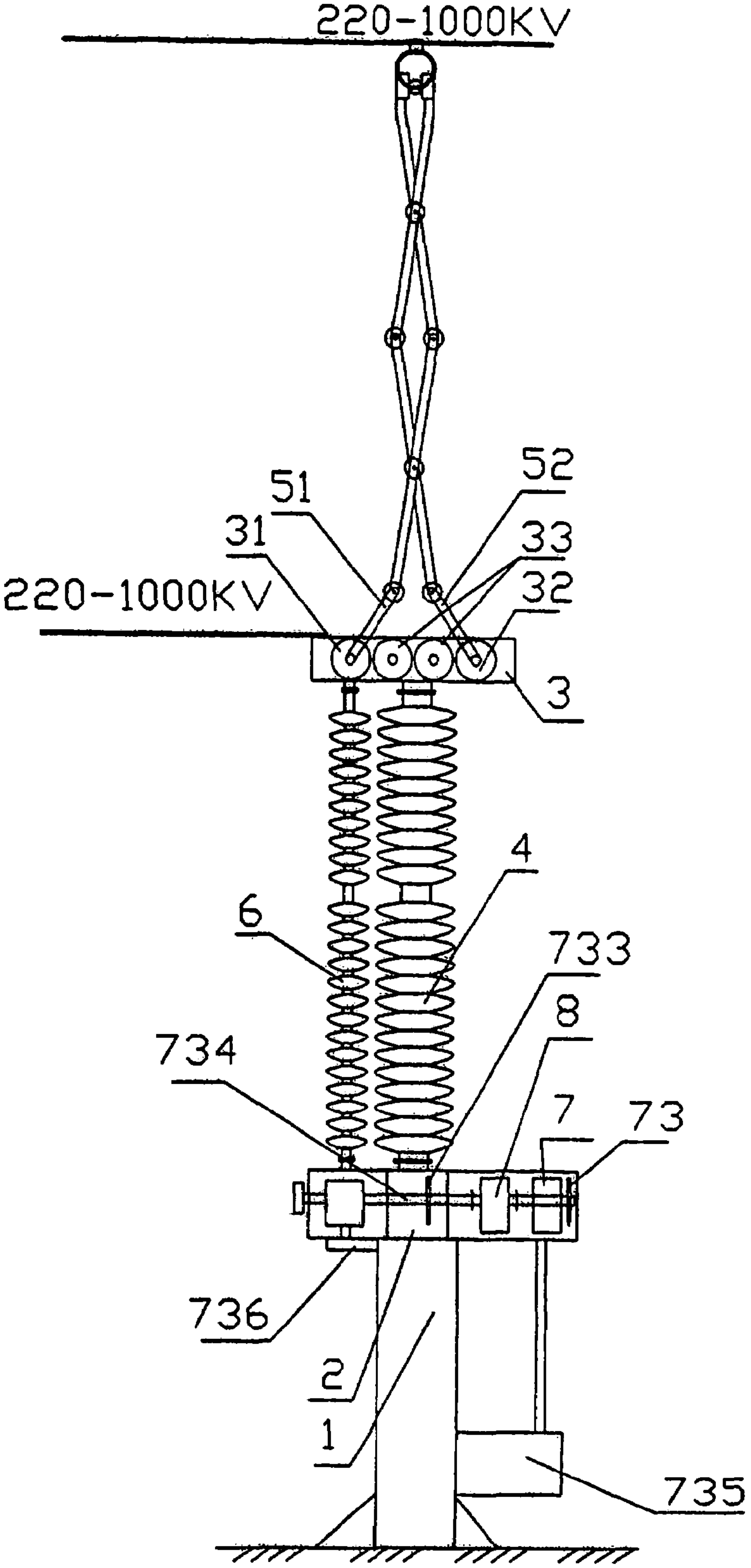
FIG. 1 is a schematic drawing of structure according to one embodiment of the present invention.
Figure 5:
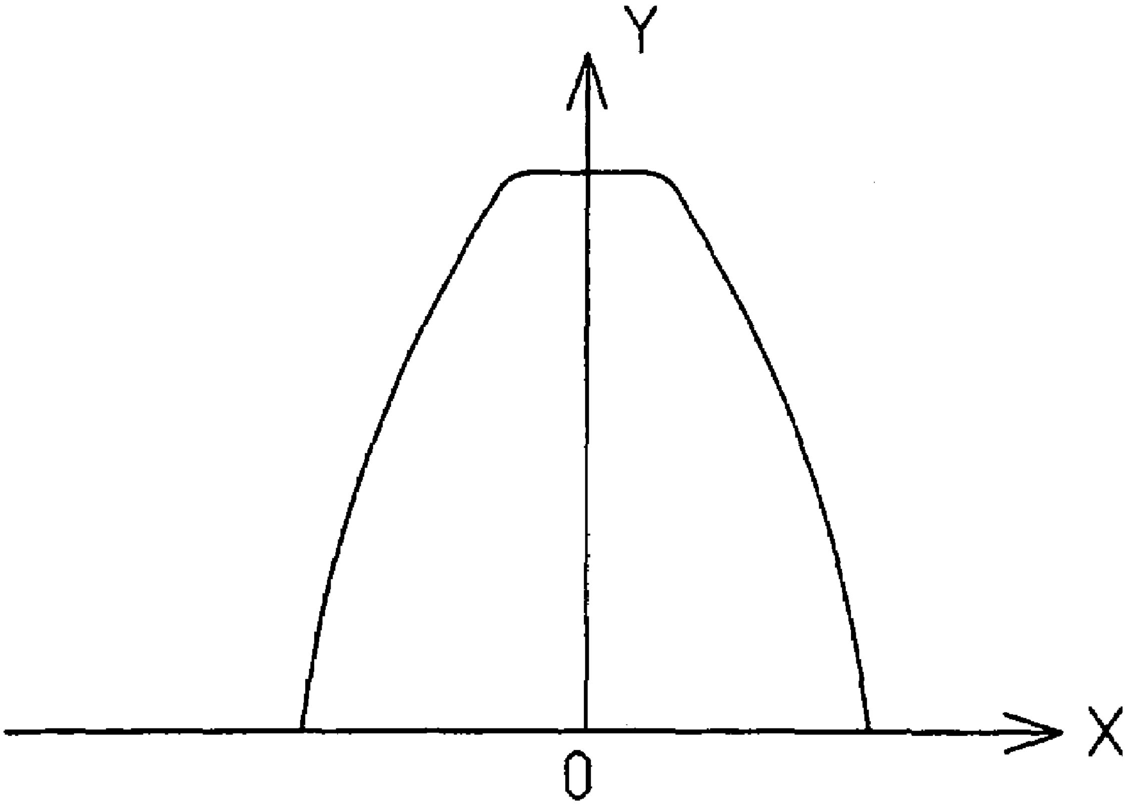
FIG. 5 is a schematic drawing of movement path of a mobile contact.

As shown in FIG. 1, an energy storage disconnecting switch of the present invention includes a base 1, a transmission case 2 and a gear box 3 fixed on top of the base 1, an insulated support 4 and an insulated revolving shaft 6 connecting the transmission case 2 and the gear box 3. The gear box 3 includes a left gear 31 and a right gear 32, which connects to a left crank 51 and a right crank 52, respectively. Two translating gears 33 are disposed between the left gear 31 and the right gear 32. It is understood that the number of the translating gears 33 may vary, such as 4, 6 or 8. Due to translating gears 33 are added in the gear box 3, which enlarge the distance between the left gear 31 and the right gear 32, the two cranks can turn to an angle of 120 degrees. Upon the crank passes the vertical point, the upper pivot starts to descend, which basically offsets the rising effect caused by decreasing angle of the two cranks. Thus, when mobile contact approaches fixed contact, the mobile contact moves in transverse direction from up-and-down motion, so as to avoid upwardly impacting the bus when the two contacts touch each other. Movement path of the mobile contact is shown in FIG. 5, in which x-axis indicates rotation angle of cranks, and y-axis indicates height of the mobile contact. In addition, upon switching on, with the effect of gravity, the two cranks tend to clamp more tightly, and thus to overcome the deficiency of contacts being easily loosened after the switch is closed.

Figure 2:
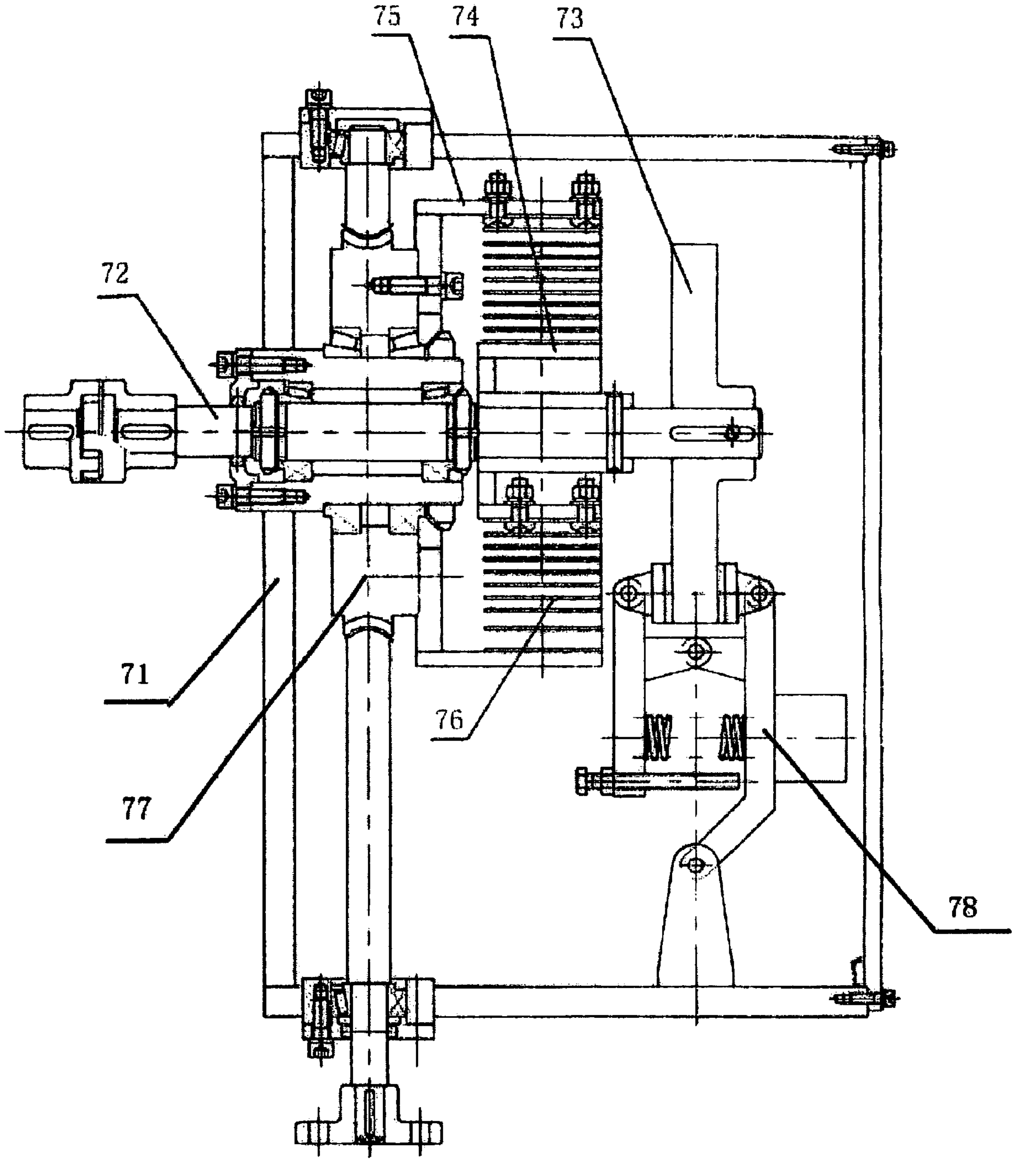
FIG. 2 is a schematic drawing of structure of an energy storage spring case.

Bottom end of the insulated revolving shaft 6 is in transmission connection with the transmission case 2, and top end of the insulated revolving shaft 6 has bevel gear which engages with the left gear 31 in the gear box 3. It is understood that the bevel gear on top of the insulated revolving shaft 6 also can engage with the right gear 32 in the gear box 3. The transmission case 2 includes an energy storage spring case 7, a bistable commutator 8 and a switch-on/switch-off brake disk 733 that are in transmission connection with a driving device 735. As shown in FIG. 2, the energy storage spring case 7 has a support 71, a horizontal shaft 72 installed on the support 71 through a bearing, an energy storage brake disk 73 fixed onto one end of the horizontal shaft 72, in which the energy storage brake disk 73 has a disc brake device 78, a spring inner support disk 74 fixed onto the other end of the horizontal shaft 72, a spring outer support disk 75 sleeved onto the support 71 through bearing, and a disc spring 76 having one end fixed onto the spring inner support disk 74 and the other end fixed onto the spring outer support disk 75. The spring outer support disk 75 is in transmission connection with the driving device through an energy storage worm and worm gear 77. The horizontal shaft 72 connects to an input shaft 81 of the bistable commutator 8 through a shaft coupler, and an output shaft 82 of the bistable commutator 8 connects to a steering worm 734 through a shaft coupler. One end of the steering worm 734 is fixed onto the switch-on/switch-off brake disk 733. The switch-on/switch-off brake disk 733 has disc brake device. The other end of the steering worm 734 connects to a worm gear at the bottom of the insulated revolving shaft 6.

Figure 3:
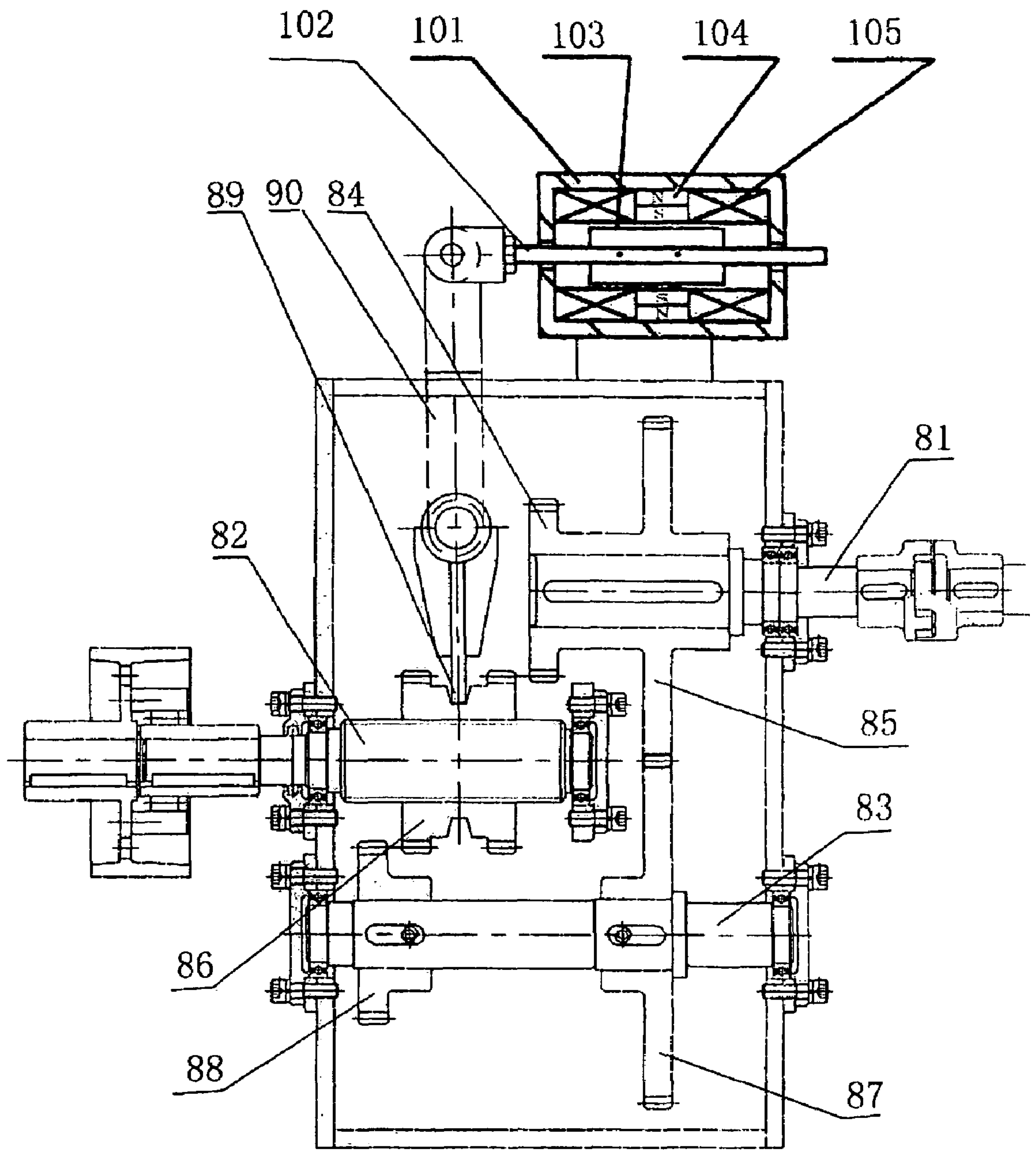
FIG. 3 is a sectional view of a bistable commutator.

As shown in FIG. 3, the bistable commutator 8 has the input shaft 81, the output shaft 82 and a transition shaft 83. The three shafts are installed in the bistable commutator through bearing, in which a switch-on gear 84 and a constant-mesh gear 85 are fixed onto the input shaft 81, a double chain gear 86 is slideably installed onto the output shaft 82 through a spline mechanism, and a constant-mesh gear 87 and a switch-off gear 88 are fixed onto the transition shaft 83. The constant-mesh gear 85 of the input shaft is engaged with the constant-mesh gear 87 of the transition gear. The double chain gear 86 is slideable on the output shaft 82 to engage with either the switch-on gear 84 or the switch-off gear 88. The double chain gear 86 connects to a fork 89. Due to the requirement that the disconnecting switch shall not be in neutral position, i.e., the double chain gear 86 at any time shall either engage with the switch-on gear 84 or engage with the switch-off gear 88, besides improvements made to the design and installation (such improvements to the design and installation are routines in the mechanical design industry, and thus will not elaborate hereafter), a bistable permanent magnet mechanism (Chinese Patent No. 98220417.5 owned by the Applicant) can be adopted as the control mechanism for the fork, to avoid possible improper manual operation of the fork.

Figure 4:
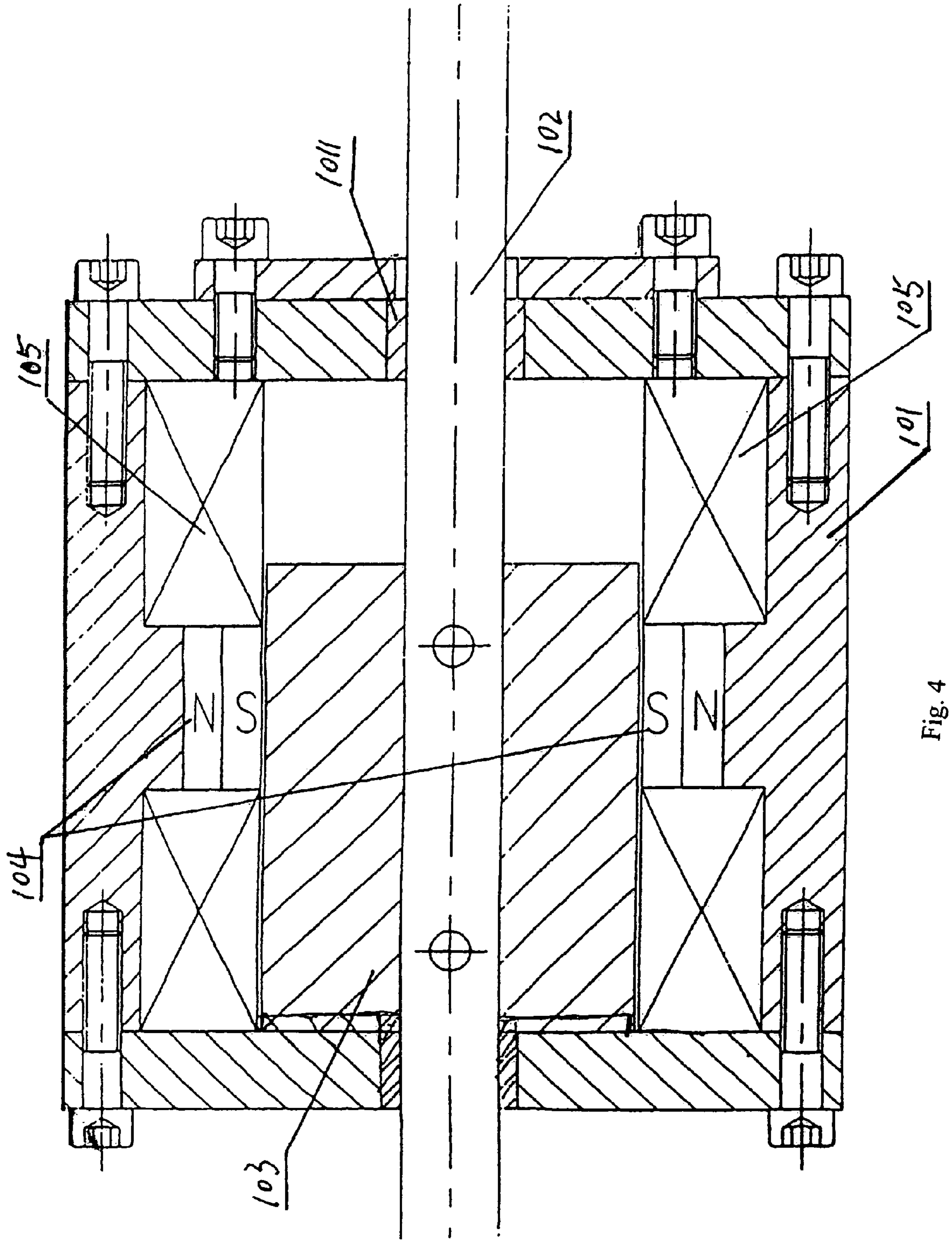
FIG. 4 is a schematic drawing of structure of a bistable permanent magnet mechanism.

The fork 89 connected to the double chain gear 86 is fixed onto a fork rod 90, and the fork rod 90 is in transmission connection with a bistable permanent magnet mechanism. As shown in FIG. 4, the bistable permanent magnet mechanism has a casing 101 with an output shaft 102 therein. The output shaft 102 extends from both ends of the casing 101, in which the front end connects to the fork rod 90. A core 103 is fixed onto the output shaft 102, and a permanent magnet 104 is disposed around the core 103. The permanent magnet 104 connects to the casing 101, and a set of impulse coil 105 is disposed on each end of the permanent magnet 104 respectively. An anti-magnetic sleeve 1011 is placed at contact part between the output shaft 102 and the casing 101. The part of the casing 101 around the anti-magnetic sleeve 1011 has inwardly raised end-cap magnetic shoes, and the middle part of the casing 101 between the two impulse coils 105 has inwardly raised casing magnetic shoes.

The driving device 735 can use motor with worm gear reducer. This is known to public, and thus will not elaborate herein.

The work principle of the energy storage disconnecting switch of the present invention is as follows:

The driving device 735 drives the spring outer support disk 75 to rotate through the energy storage worm and worm gear 77. At the same time, due to the disc brake device 78 locks the energy storage brake disk 73, the horizontal shaft 72 and the spring inner support disk 74 are unable to move, and the spring outer support disk 75 rotates to tighten the disc spring 76 for ready to use. When the left crank 51 and the right crank 52 are required to move, firstly operates the bistable commutator 8 to work position through an electric control device; then operates brake device to loosen the energy storage brake disk 73 and the switch-on/switch-off brake disk 733, the horizontal shaft 72 quickly rotates under the effect of the disc spring 76, and drives the steering worm 734 to rotate through the bistable commutator 8; and finally drives the insulated revolving shaft 6, which in turn drives the left gear 31 and the right gear 32 in the gear box 3 to rotate in opposite directions; so as to lower or raise the cranks to turn on/turn off the switch. When the cranks move to the right position, the electric control device starts up brake device to lock the energy storage brake disk 73 and the switch-on/switch-off brake disk 733, the horizontal shaft 72, the steering worm 734 and the insulated revolving shaft 6 stop rotating, to end the switch-on/switch-off operation. The electric control device operates the driving device 735 to re-start to store energy in the disc spring 76. When the energy stored in the spring 76 reaches a preset value, the driving device 735 stops to wait for the next work circle.

One function of the bistable commutator 8 is to turn the single direction twisting force of the horizontal shaft 72 into two different directions when acting on the insulated revolving shaft 6 via commutation.

Further, the output end of the bistable commutator 8 connects the insulated revolving shaft 6 through worm and worm gear. Thus, the rotating angle of the insulated revolving shaft 6 in working can be less than 360 degrees, which makes it convenient to install an orientation switch 736 at the bottom end of the insulated revolving shaft 6, to determine whether the cranks are in right positions by measuring the rotating angle of the insulated revolving shaft 6, to provide data to the electric control device.

In addition, a manual energy storage handle can be installed on the driving device 735. When the motor experiences malfunction and cannot store energy, it is possible to store energy manually, to ensure switch-on/switch-off unaffected. The energy storage brake disk and the switch-on/switch-off brake disk can effectively guarantee the switch-on/switch-off status and the spring status staying unchanged when the bistable commutator 8 commutates, so that the commutator 8 can reliably change directions.

The energy storage disconnecting switch can effectively improve the characteristics of switch-on/switch-off. In practical use, it can be designed as double scissor type, center disconnecting type, vertical opening type, or both sides disconnecting type.

I claim:

1. An energy storage disconnecting switch, including a base, a transmission case and a gear box fixed on top of the base, an insulated support and an insulated revolving shaft connecting the transmission case and the gear box; the gear box including a left gear and a right gear, the left gear and the right gear respectively connecting to a left crank and a right crank; bottom end of the insulated revolving shaft in transmission connection with a driving device, and top end of the insulated revolving shaft having bevel gear engaged with the gear in the gear box;

characterized in:

the transmission case including an energy storage spring case and a bistable commutator in transmission connection with the driving device; the energy storage spring case having a support, a horizontal shaft installed on the support through a bearing, an energy storage brake disk fixed onto one end of the horizontal shaft, a spring inner support disk fixed onto the other end of the horizontal shaft, a spring outer support disk sleeved onto the support through bearing, a disc spring having one end fixed onto the spring inner support disk and the other end fixed onto the spring outer support disk; the spring outer support disk in transmission connection with the driving device through an energy storage worm and worm gear; the horizontal shaft connecting to an input shaft of the bistable commutator through a shaft coupler, an output shaft of the bistable commutator in transmission connection with the insulated revolving shaft through a steering worm.

2. The energy storage disconnecting switch according to claim 1, in which a plurality of translating gears are disposed between the left gear and the right gear, and the number of the translating gears is even.

3. The energy storage disconnecting switch according to claim 1, in which the input shaft, the output shaft, a transition shaft are installed in the bistable commutator; a switch-on gear and a constant-mesh gear being fixed onto the input shaft, a double chain gear being slideably installed onto the output shaft through a spline mechanism, and a constant-mesh gear and a switch-off gear being fixed onto the transition shaft; the constant-mesh gear of the input shaft being engaged with the constant-mesh gear of the transition shaft, the double chain gear being slideable on the output shaft to engage with the switch-on gear of the input shaft or the switch-off gear of the transition shaft, and the double chain gear in connection with a fork.

4. The energy storage disconnecting switch according to claim 3, in which the fork connected to the double chain gear is fixed onto a fork rod, and the fork rod is in transmission connection with a bistable permanent magnet mechanism; the bistable permanent magnet mechanism having a casing with an output shaft therein, the output shaft extending from both ends of the casing, with the front end connecting to the fork rod; the output shaft having a core thereon, and a permanent magnet being disposed around the core; the permanent magnet connecting to the casing, and a set of impulse coil disposed on each end of the permanent magnet respectively; an anti-magnetic sleeve placed at contact part between the output shaft of the permanent magnet mechanism and the casing, the casing around the anti-magnetic sleeve having inwardly raised end-cap magnetic shoes, and the casing between the two impulse coils having inwardly raised casing magnetic shoes.

5. The energy storage disconnecting switch according to claim 2, in which the input shaft, the output shaft, a transition shaft are installed in the bistable commutator; a switch-on gear and a constant-mesh gear being fixed onto the input shaft, a double chain gear being slideably installed onto the output shaft through a spline mechanism, and a constant-mesh gear and a switch-off gear being fixed onto the transition shaft; the constant-mesh gear of the input shaft being engaged with the constant-mesh gear of the transition shaft, the double chain gear being slideable on the output shaft to engage with the switch-on gear of the input shaft or the switch-off gear of the transition shaft, and the double chain gear in connection with a fork.

6. The energy storage disconnecting switch according to claim 5, in which the fork connected to the double chain gear is fixed onto a fork rod, and the fork rod is in transmission connection with a bistable permanent magnet mechanism; the bistable permanent magnet mechanism having a casing with an output shaft therein, the output shaft extending from both ends of the casing, with the front end connecting to the fork rod; the output shaft having a core thereon, and a permanent magnet being disposed around the core; the permanent magnet connecting to the casing, and a set of impulse coils disposed on each end of the permanent magnet respectively; an anti-magnetic sleeve placed at contact part between the output shaft of the permanent magnet mechanism and the casing, the casing around the anti-magnetic sleeve having inwardly raised end-cap magnetic shoes, and the casing between the two impulse coils having inwardly raised casing magnetic shoes.

* * * * *